United States Patent [19]
West

[11] Patent Number: 5,992,933
[45] Date of Patent: Nov. 30, 1999

[54] TILTABLE SEAT MOUNT INSERT ASSEMBLY

[76] Inventor: James Otto West, N-545 Homestead Rd., Vulcan, Mich. 49892

[21] Appl. No.: 08/984,770

[22] Filed: Dec. 4, 1997

[51] Int. Cl.⁶ ........................................................ B60N 2/10
[52] U.S. Cl. .......................... 297/313; 297/314; 297/325; 297/326; 297/327
[58] Field of Search .................................... 297/313, 314, 297/325, 326, 327, 344.16

[56] References Cited

U.S. PATENT DOCUMENTS

| | | | |
|---|---|---|---|
| 2,409,714 | 10/1946 | Si Lhan | 297/314 X |
| 2,489,981 | 11/1949 | Rose | 297/314 X |
| 2,519,163 | 8/1950 | Turner | 297/314 X |
| 2,572,910 | 10/1951 | Brown | 297/314 X |
| 2,707,986 | 5/1955 | Johnson | 297/314 X |
| 2,715,938 | 8/1955 | Miller | 297/314 X |
| 2,984,290 | 5/1961 | Miller | 297/314 X |
| 3,021,107 | 2/1962 | Salo | 297/314 X |
| 3,466,089 | 9/1969 | Stueckle | 297/314 |
| 3,670,834 | 6/1972 | Rogers | 297/314 X |
| 4,057,213 | 11/1977 | Kokkila | 297/314 X |
| 4,095,770 | 6/1978 | Long | 297/314 X |
| 4,432,525 | 2/1984 | Duvall | 297/314 X |

FOREIGN PATENT DOCUMENTS

| | | | |
|---|---|---|---|
| 24 42 766 | 3/1976 | Germany | 297/314 |

*Primary Examiner*—Milton Nelson, Jr.
*Assistant Examiner*—Rodney B. White

[57] ABSTRACT

An adjustable device to support a seat on a machine or vehicle that is laterally pivotal about an axis parallel to the longitudinal axis of the machine to permit the seat to accommodate uneven terrain. At the will of the operator, this device can be adjusted to a horizontal position, thereby providing comfort and safely when operating a machine on uneven terrain. The device is to provide an improved seat mounting wherein the seat swings from a common point and movement thereof is controlled by an electromechanical linear actuator, activated by a double throw-double pole switch, (voltage determined by equipment manufacturer), located within easy access of operator. Another important object resides in providing a way to secure seat in a fixed horizontal to seat mounting in the event of malfunction or power failure. Spare clevis pins, provided with hair pin clips, could be inserted in pre-drilled holes which will secure seat and movable framework to base assembly parallel to each other.

2 Claims, 6 Drawing Sheets

SEAT MOUNT

SIDE VIEW

TOP VIEW

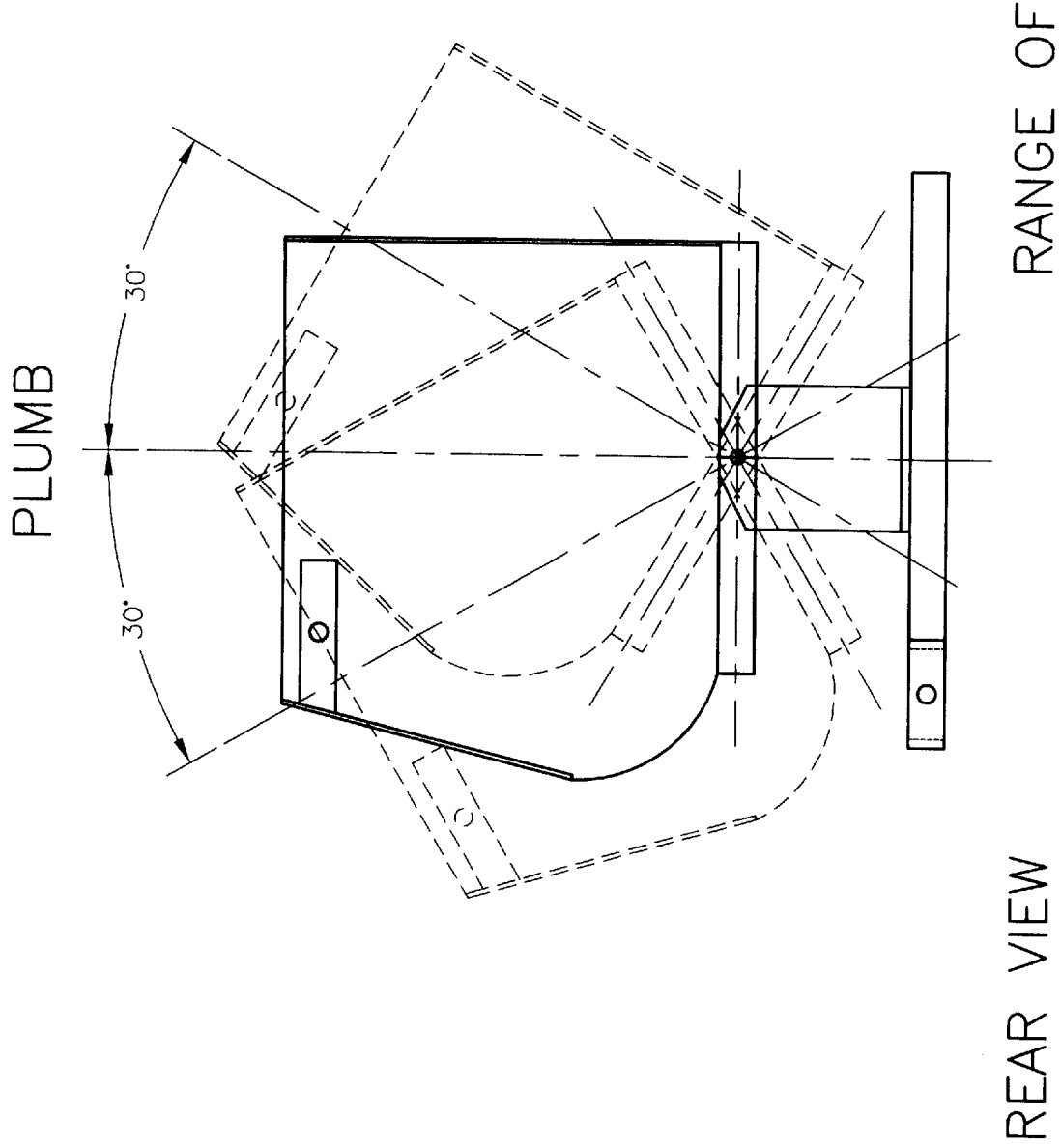

TILTABLE SEAT MOUNT INSERT ASSEMBLY

BACKGROUND OF THE INVENTION

This invention relates to the mounting to which a seat is attached to various types of construction equipment, logging and farming equipment.

THE DESCRIPTION OF THE RELATED ARTS

The operator of equipment typically had to sit uncomfortably while being tilted for periods of time while performing various tasks.

A person which rides uncomfortably on only a portion of their anatomy, will find operation of equipment difficult due to impaired balance. There will be times an operator will position the body to take away stress from difficult seating and at the same time position arms and feet away from equipment controls. Response time to reach controls could be increased making safety a concern.

Some examples of the prior art of a leveling seat assembly are set forth in the patents briefly described. The Salo U.S. Pat. No. 3,021,107 allows a self leveling tractor seat to adjust when a weighted valve spool swings to center by gravity directing oil to a cylinder thus pivoting seat. Although the seat levels itself, the structure height of the assembly, the hydraulics involved with the cost required to manufacture could be prohibitive.

The Rogers U.S. Pat. No. 3,670,834 allows the operator to tilt the frame to which the seat is attached which would include steering wheel, dash and foot rests. Leveling of the seat assembly is done at great expense since the tractor has to be built and designed around the seat. Costs for this arrangement is prohibitive.

The Miller U.S. Pat. No. 2,984,290 shows a combination of leveling and ride suspension. Although tilting of seat would make the ride easier for the operator, it transfers the body weight further to the lowest wheel which on a small tractor could change dramatically the center of gravity. Cost and space area used in the tilting of seat assembly inside cab area could be prohibitive.

The Long U.S. Pat. No. 4,095,770 allows the operator in control to tilt a seat assembly through control of oil transferred between two cylinders. This would require an operator to transfer his (her) weight to the highest side before controlling the valve which allows oil to transfer to lowest cylinder. Cost to make and maintain could be prohibitive.

SUMMARY OF INVENTION

This invention is mounted between the seat on which the operator sits and the equipment to which it is mounted. A portion of the existing seat mount hardware can be used when mounting to the tilting base assembly. If the seat has safety switching supplied by manufacture of seat or equipment that it's mounted on, all controlling items can remain functional and in place.

Said invention should be used on large equipment and including down sized riding mowers. Any equipment equipped with electrical power source can be upgraded when fitted with seat mount. The two piece tilting base assembly is powered by a electromechanical Linear Actuator. A three position, double pole double throw switch, controls the tilting of the seat mount. The operator will control the positioning of the seat, by turning switch control to designed side to be tilted.

The seat base can be tilted to 30 degree left of vertical or tiled to 30 degree right of vertical. Actuation is smooth and rapid to level of comfort by degree increments.

The prior art of seat movements required to person the shift body weight while jerking the seat to move in direction desired.

Said invention allows the operator to sit comfortably with body weight plumb to gravity. Foot controls and hand controls are better operated when the body can react from a natural flat seated position.

DETAIL DESCRIPTION

Tractors, crawler or other machines are typically fitted with cabs which could be space confining. Seat assembles with movements other then tilting at low axis could put operator close to cab walls thus substantially eliminating the displacement of the operators hands and feet with respect to the controls.

The present invention is a much needed alternative in place of high cost, high maintenance tiltable structures.

The invention is made of steel, will not burn, nor rot, and is rodent proof. It is fabricated and welded to form two square type frameworks, that are (pinned) together in the center at a height to allow tilting of an attached seat, (which is larger than base is mounted onto) to tilt 30 degrees left of vertical or 30 degrees right of vertical.

There is a welded mounted support channel that serves as the upper actuator pin mount. This is welded onto the upper seat mount framework.

The seat mount framework can be adapted to existing operating equipment seat mechanism. Such as spring, air ride, torsion bar or solid mounted seats.

The lower mount frame work includes the welding of pivot mounts to the forward and rearward members and the lower actuator mount brackets.

Clevis pins create the pivots for the two frame assemblies. Lower mount frame can have extra mount holes, pre-drilled for any added hardware needed to secure the equipment to which it is being attached.

The lower mounting assembly will include two extra clevis pins in storage holes, held in place by hair pin cotters to be removable and used in two pre-drilled holes in an event of malfunction of power supply. A pin would be pulled from top of activators, and seat leveled to horizontal with lower mount frame, then repined with two spare pins in the pre-drilled support holes. Seat then is returned to standard position, level with base mount.

BRIEF DESCRIPTION OF THE DRAWINGS

FIG. 1 is a fragmentary perspective view showing the details of the pivotal mounting of the seat and attached electromechanical linear actuator and it's pin mounting to upper laterally tiltable seat mount and the pin mounting to FIG. 2 seat mount lower base.

FIG. 2 is a fragmentary front view of seat mount lower base showing the details of the pivotal mount which secures the tiltable seat mount which would have a seat assembly (not shown) fastened to said equipment.

FIG. 3 is a fragmentary front view of the upper laterally tiltable seat mount and it's pivotal centerline and location for upper clevis pin mounting of a electromechanical linear actuator. Welding information and position of corner supports shown.

FIG. 4 is a top view and side view of the pined upper lateral tiltable seat mount and lower seat mount base assembly.

FIG. 5

FIG. 5 viewed from rear range of motion in which lateral movement in degrees are shown to left of vertical and right of vertical.

DESCRIPTION OF THE PREFERRED EMBODIMENT

Figure 1:
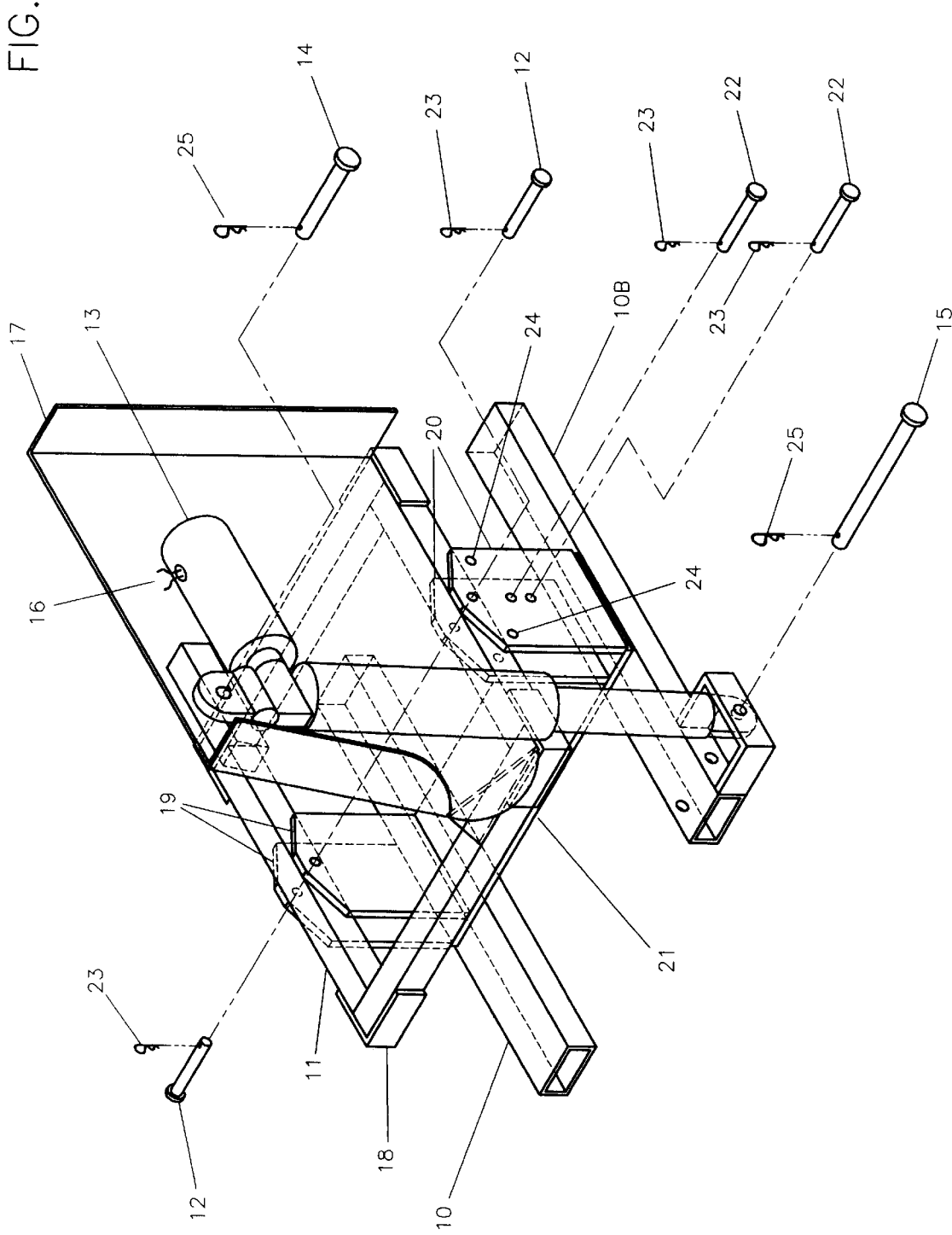
FIG. 1
Figure 2:
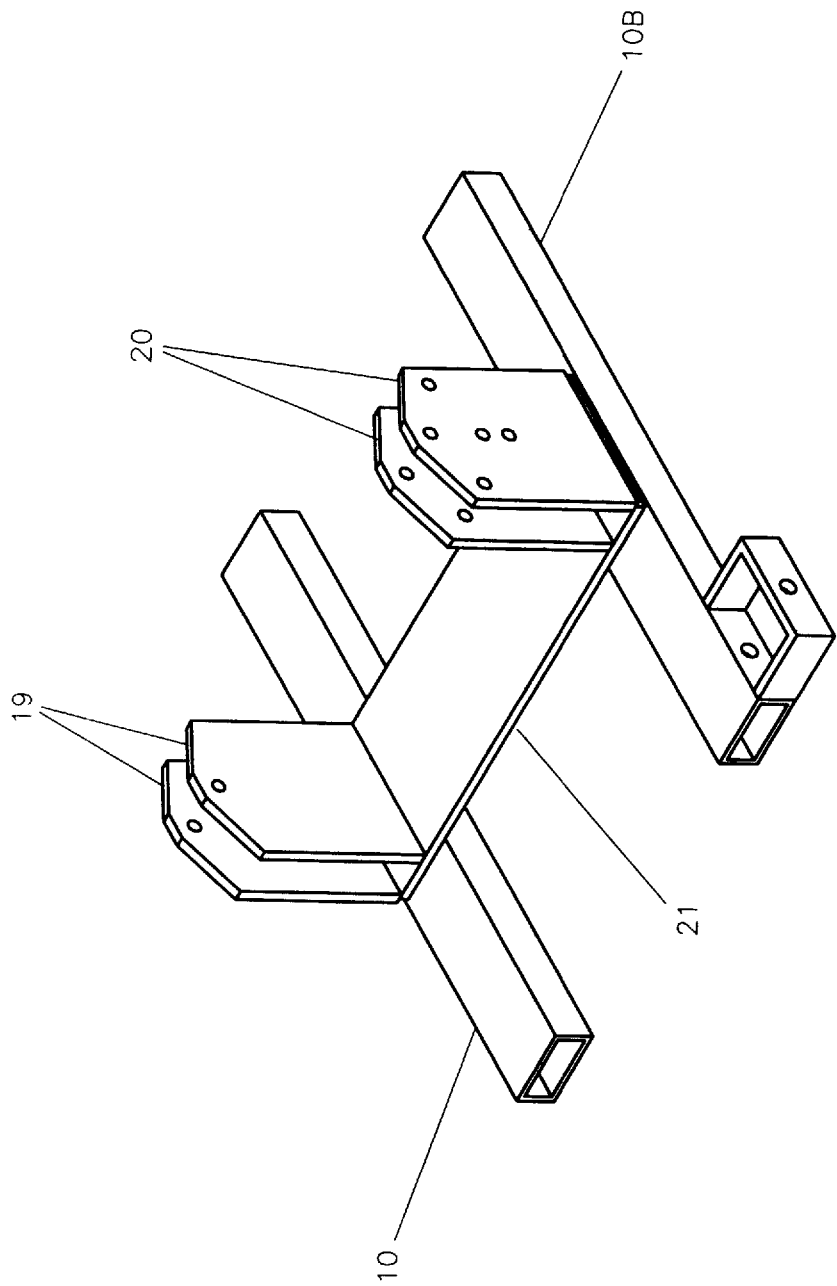
FIG. 2
Figure 3:
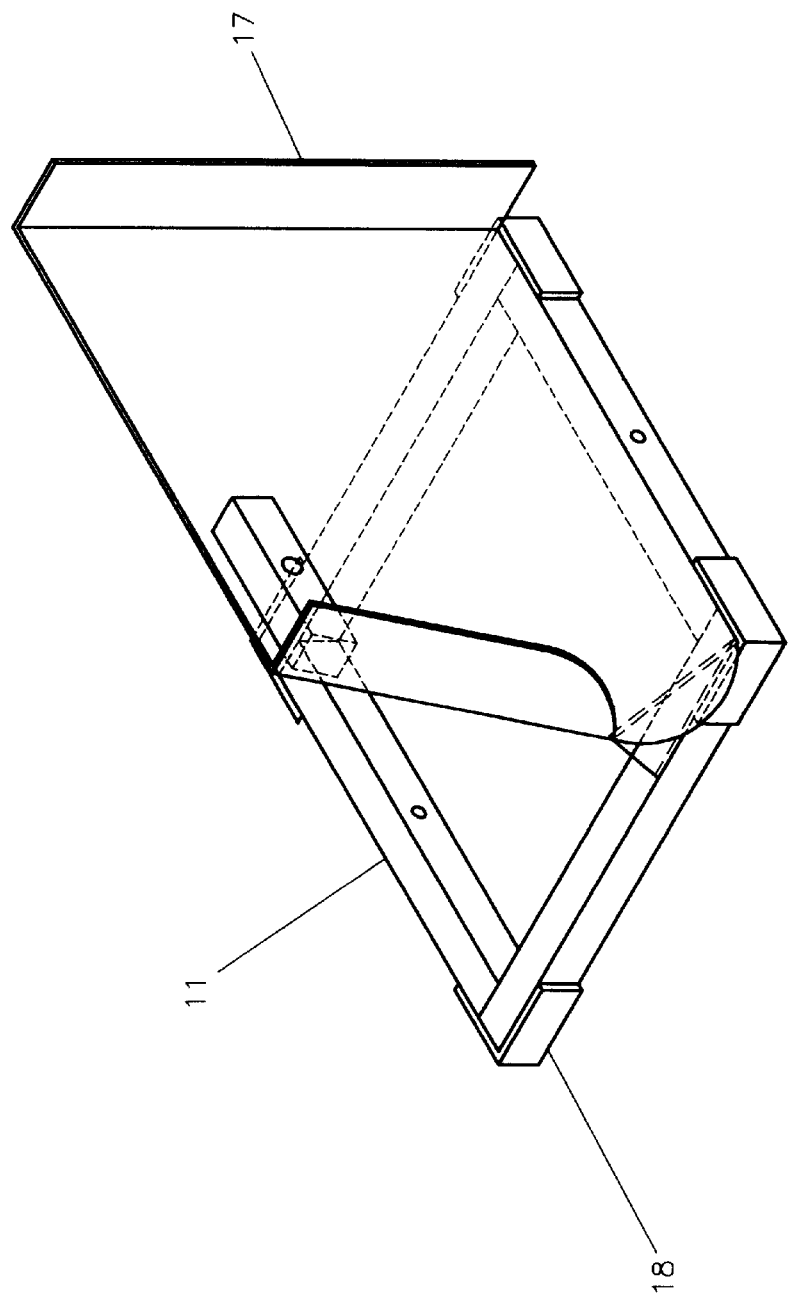
FIG. 3
Figure 4A:
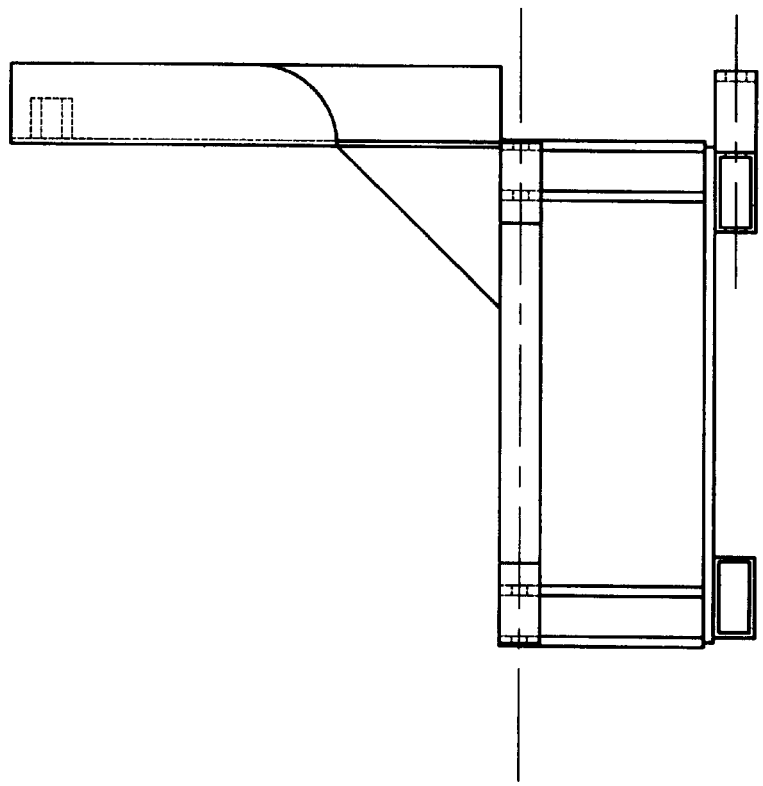
FIG. 4
Figure 4B:
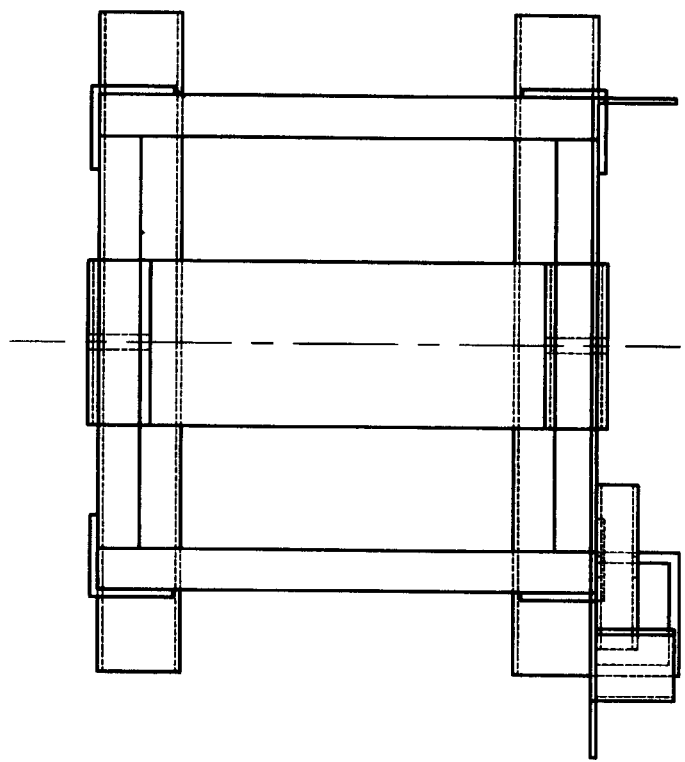

Having reference now more particularly to the drawing of FIG. 1, a tiltable seat mount assembly is indicated in it's entirety by the numeral 10. It will be understood, however, that the seat mount assembly may be used on a tractor, any other machine or implement which is required to traverse undulating surfaces. The seat mount lower base would be secured to machine by welding or bolting the ends of 10a and 10b. The upper seat mount assembly 11 pivots around the axis 12. The seat mount assembly 11 is prevented from swinging free and is restricted by a electromechanical linear actuator 13 pinned to upper seat mount pin 14 and to lower mount base by pin 15. The actuator 13 moves in response to an operator's signal which is actuated by a double pole double-throw switch, powered by the machine's power source(such as a 6 volt, 12 volt, or 24 volt battery) by original equipment manufacturer. Power from the switch to the actuator through wires 16 causes the actuator to extend or retract, thereby laterally tilting the seat mount. The upper seat mount is made of steel square tubing and a plate which is continuously welded to result in a platform that allows the mounting of any type equipment seat either by welding or by the use of fasteners. The back mount plate 17 also serves as an upper actuator mount. Outside corners 18 are capped and seam welded. Base plate assembly is made of steel rectangular tubing and welded to two uprights 19 and two rearward uprights 20. A tie plate between uprights 21 is also seam welded. The rear most uprights have four extra holes which stainless steel clevis pins 22 are stored in the center holes with stainless steel hairpin clips 23, in the event of malfunction or power failure the seat mount (with seat) should be secured parallel with the base 10, by pulling hairpin clip 23 from pin 14, pulling clip 23 from the two pins 22, leveling the seat and inserting pins 22 into holes 24 and reinserting hairpin clips 23 into pins 22. The three other clevis pins have standard cotter pins 25.

I claim:

1. A tiltable seat mount assembly adapted for attachment to a lawn mower, tractor, and other agricultural and logging machinery with an existing seat assembly, the tiltable seat assembly comprising a seat to receive an operator of the machinery and a support structure for attachment of the seat to the machinery, the tiltable seat assembly adapted for attachment to the existing seat assembly of the machinery, the tiltable seat assembly comprising:

a base mount assembly to be secured to the support structure by mounting means, the base mount assembly having two pairs of upright structures, each upright structure aligned directly opposite and parallel to each other, each pair of upright structures spaced apart from one another to permit insertion of a seat corresponding in size to a space between the spaced apart pairs of upright structures, each upright structure having an aperture, the apertures aligned directly opposite each other;

a tiltable seat having a front, a rear, and two lateral sides, with the seat having two apertures, one aperture at the front side of the seat and the other aperture of the rear side of the seat, the apertures at the front side of the seat and the other aperture at the rear side of the seat, the apertures of the seat aligned with the apertures of the upright structures, a pin inserted through the aligned apertures of the upright structures and the seat, creating a central pivot extending through the aligned apertures, permitting the pivotal seat to tilt laterally when the seat receives or is subjected to a sufficient amount of force;

a vertical electromechanical linear actuator connected between the base mount assembly and the rear side of the tiltable seat to achieve lateral positioning angles of the seat, the vertical electromechanical linear actuator preventing and restricting movement of the tiltable seat, the vertical electromechanical linear actuator connected to a motor in a rack and pinion relationship, the motor adapted to be connected to a power source of the machinery, the motor controlled by a switch connected to the motor, the switch allowing the operator to selectively extend and retract through a rack and pinion action between the vertical electromechanical linear actuator and motor and laterally tilt the seat to achieve a desired positioning angle of the seat.

2. A tiltable seat mount assembly, according to claim 1 in which the upright structures of the base mount assembly has a plurality of holes that receive a corresponding number of pins to permit an operator to manually pin the tiltable seat to the base mount assembly should a problem with the electromechanical linear actuator or a power supply interruption occurs, the pins removed and reinserted in holes which position the tiltable seat in a horizontal position with respect to the base mount assembly.

* * * * *